April 7, 1931.    C. D. HEVENOR    1,800,071
AUTOMATIC LINE FINDER
Filed Sept. 12, 1929    2 Sheets-Sheet 1
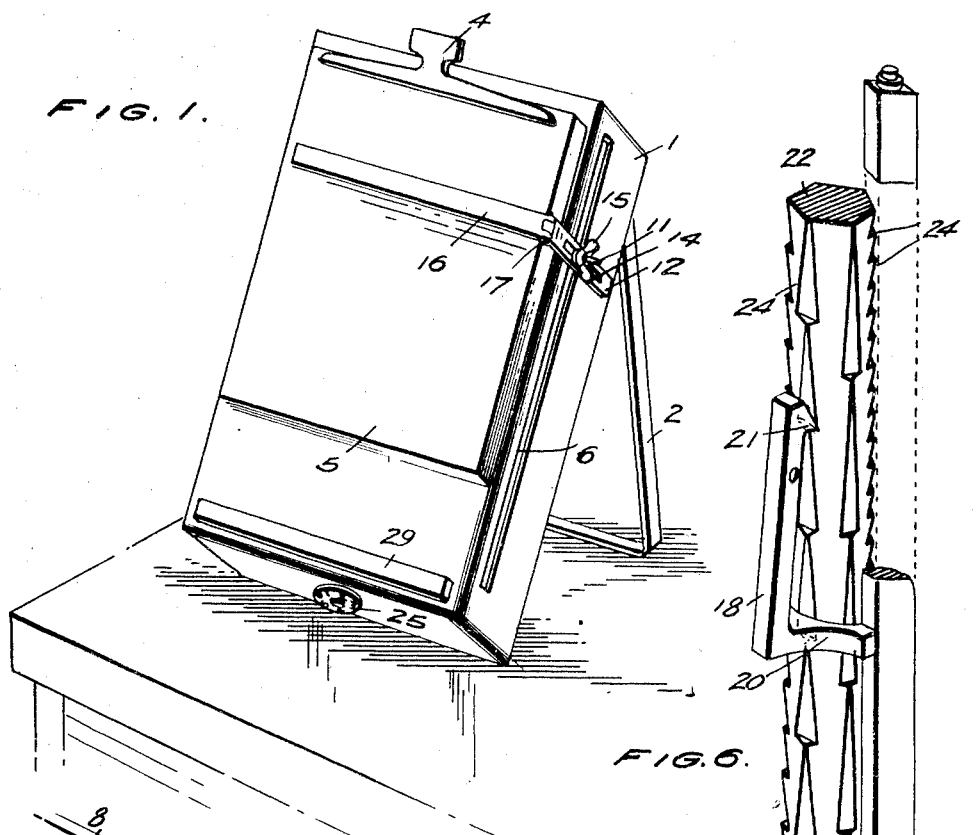
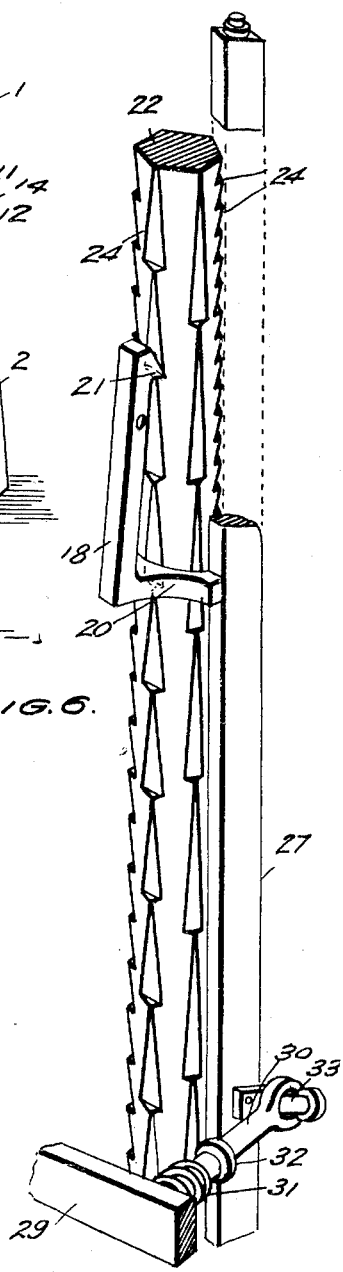
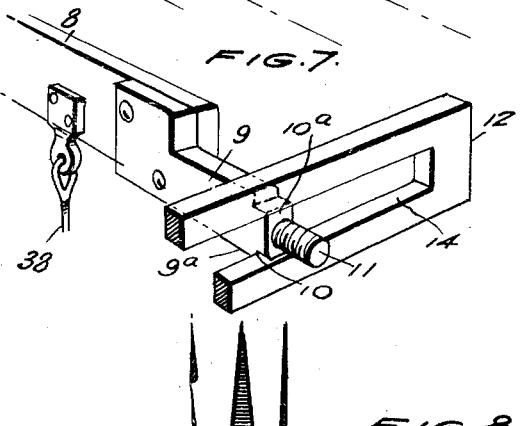
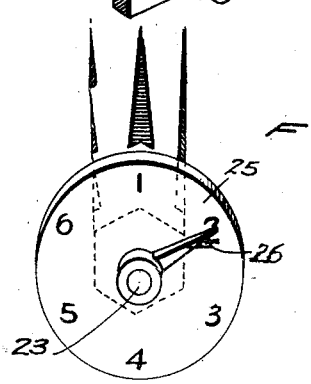
CHARLES D. HEVENOR
Inventor
By C A Snow & Co.
Attorneys.

April 7, 1931.   C. D. HEVENOR   1,800,071
AUTOMATIC LINE FINDER
Filed Sept. 12, 1929   2 Sheets-Sheet 2
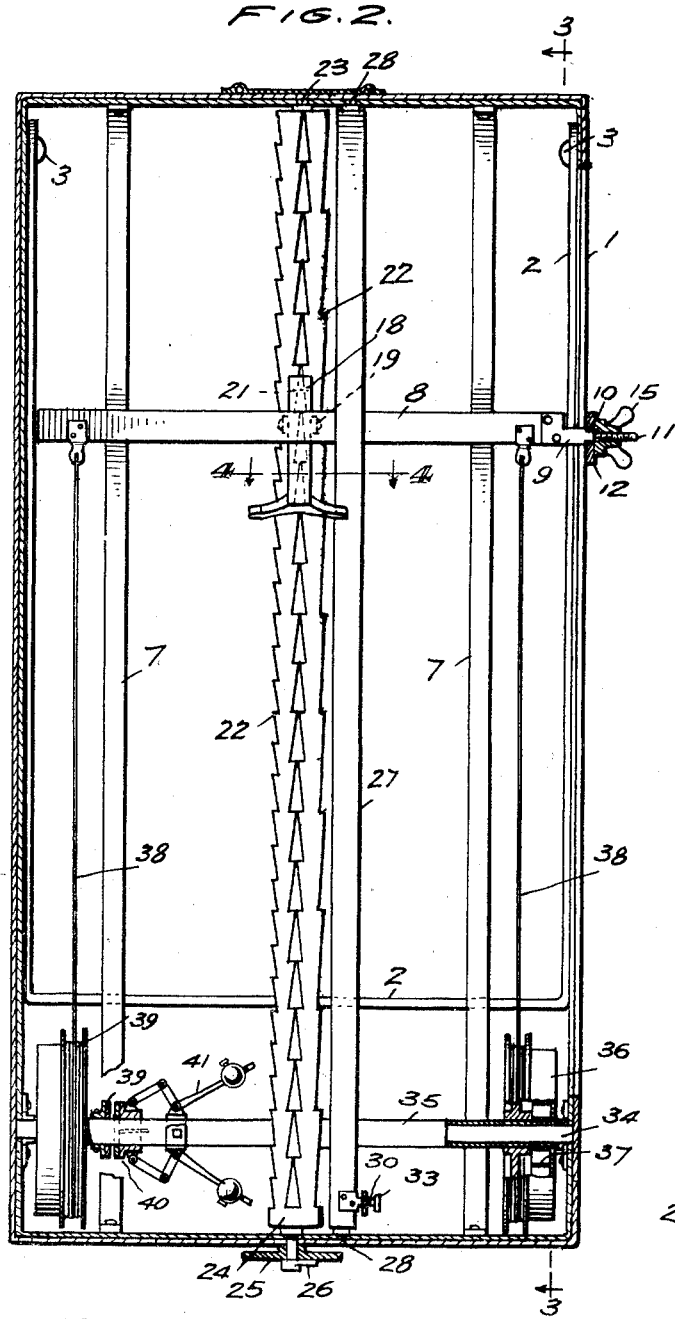
FIG.2.
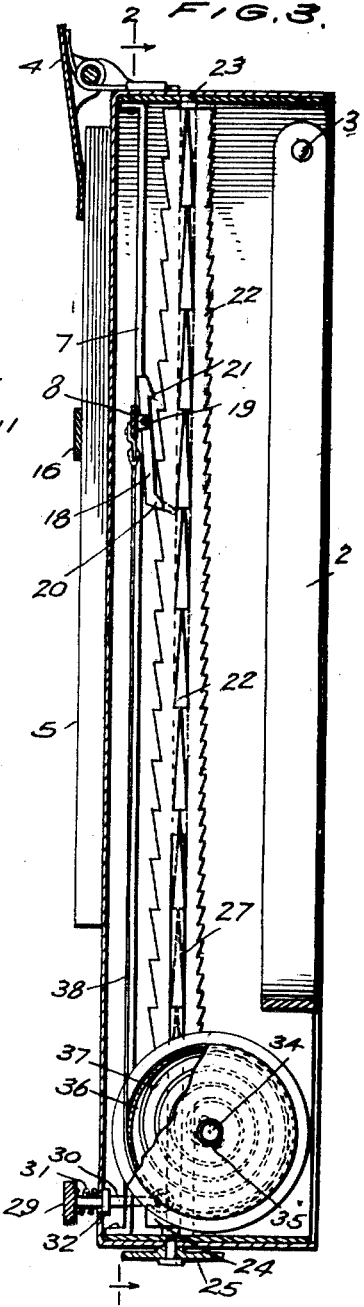
FIG.3.
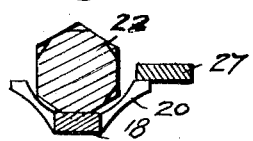
FIG.4.
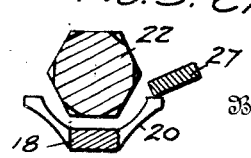
FIG.5.   CHARLES D. HEVENOR
Inventor Patented Apr. 7, 1931

1,800,071

UNITED STATES PATENT OFFICE

CHARLES D. HEVENOR, OF BUFFALO, NEW YORK

AUTOMATIC LINE FINDER

Application filed September 12, 1929. Serial No. 392,143.

This invention aims to provide a simple means whereby a copyist can keep track of the line on the manuscript which she is copying.

I have selected a preferred form for illustration, but a mechanic who abides by the claims can make changes in that form without departing from the spirit.

Figure 1 shows my line-finder in perspective; Figure 2 is a longitudinal section on the line 2—2 of Figure 3; Figure 3 is a longitudinal section on the line 3—3 of Figure 2; Figures 4 and 5 are cross-sectional views taken through the rack bar; Figure 6 is a perspective view showing a portion of the rack bar and parts that cooperate with it; Figure 7 is a perspective view showing one end of the carriage and attendant parts; Figure 8 is a perspective view showing the dial and parts associated therewith.

The numeral 1 marks a support in the form of a box-like casing open at the back. The support 1 may be laid down flat on a desk, or it may be stood up at an angle, as in Figure 1, and then the support is sustained by a prop 2 adapted to be swung within the support when not in use, and pivoted at 3 to the support. A clip 4 holds on the support 1 the manuscript 5 which is to be copied. There is a slot 6 in the side of the support, and fixed longitudinal tracks 7 are secured inside the support. A carriage 8 slides on the tracks 7 and has rectangular parts 9 and 9a forming, respectively, shoulders 10 and 10a. A threaded tip 11 projects from the shoulder 10a, and a wing nut 15 is mounted on the tip. The part 9 slides in the slot 6, and the part 9a, slides for adjustment in the slot 14 of a bracket 12 to which is hinged at 17 to the index 16. The bracket 12 can be adjusted in and out to make the index 16 lie flat on the manuscript 5, and after the desired adjustment has been attained, the bracket 12 can be bound between the shoulder 10 and the wing nut 15. An escapement lever 18 is pivoted at 19 to the carriage 8 and is provided at one end with a fork 20 and at the opposite end with a pawl 21. The fork 20 straddles and engages a rack bar 22. The lever 18 is so hung at 19 that, without using a spring, the fork 20 will engage the rack bar 22, and pawl 21 being spaced from the rack bar.

The rack bar 22 has racks 24, the teeth of which are of different lengths. In order to bring any desired rack up for cooperation with the escapement lever 18, the rack bar 22 has shafts 23 journaled in the ends of the support 1. On one of the shafts 23 is an index 26 adapted to bear frictionally against a dial 25 on the support 1. The index and the dial serve two purposes. First, they enable the operator to rotate the rack bar 22 and select the rack 24 that she wishes to use; and second, because the index 26 has frictional engagement with the dial 25, these parts cooperate to prevent the rack bar 22 from turning accidently on its axis, the selected rack 24 being kept in place to cooperate with the lever 18. A shaft 27 is journaled at 28 in the ends of the support 1 and is of oblong cross-section. The shaft 27 cooperates with one arm of the fork 20 of the escapement lever 18, as shown in Figures 4 and 5. The shaft 27 may be rotated in any desired way, for instance by an operating member or bar 29 located outside the support 1 and secured to a plunger 30 mounted for right line sliding movement in the support 1, an expansion spring 31 being interposed between the bar 29 and the support 1. Outward movement of the plunger 30 under the action of the spring 31 is prevented by an abutment 32 on the plunger 30, the abutment being adapted to engage the inner surface of the front of the support 1. The inner end of the plunger 30 is pivoted at 33 to the shaft 27 in offset relation to the axis of rotation of the shaft.

A fixed shaft 34 is secured in the support 1, and a tubular shaft 35 turns on the shaft 34. Drums 36 are secured to the shaft 35, and torsion springs 37 connect the drums 36 with the fixed shaft 34. Flexible elements 38 are wound about the drums 36 and connected to the carriage 8. A brake member 39 is secured to one of the tracks 7. A brake member 40 slides on the shaft 35 and is under the control of a governor mechanism 41 on the shaft 35.

The operator pushes on and releases the operating member 29, the plunger 30 rocks the shaft 27, the shaft 27 tilts the escape lever 18, the escape lever cooperating with the selected one of the racks 24 to permit the flexible elements 38 to pull down the carriage 8 and the index 16 step by step, as the flexible elements are wound on the drums 36 by the action of the springs 37. The operator, thus, can keep any desired line on the manuscript 5 in place adjacent, the index 16, until that line has been copied. By rotating the bar 22, different racks 24 may be brought into cooperation with the escape lever 18, the provision of a plurality of racks affording accommodation for manuscripts the lines of which are spaced apart by different distances. The operator can swing the index 16 on the hinge 17 clear of the manuscript 5, and the manuscript 5 can be released from the clip 4.

When the step by step movement hereinbefore described, and illustrated in Figure 6, is resorted to, the governor mechanism 41 is of limited utility. It is of primary importance under conditions now to be described.

Referring to Figure 8, it will be obvious that the rack bar 22 may be rotated until the index 26 is between the characters on the dial 25. Then, one of the smooth, longitudinal surfaces of the rack bar will be presented to the parts 21—20 of the escapement lever, and the escapement lever (18) will not function, the carriage 8 moving uninterruptedly along the tracks 7, but for the action of the governor 41. Clearly, when the shaft 35 begins to turn too fast, thereby causing the carriage 8 and the index 16 to move down the page faster than the typist can transcribe conveniently, the governor 41 will get in its work and hold back the index 16 to a speed down the printed page that is commensurate with the operator's ability to transcribe on a typewriter from the copy supplied.

I claim:—

1. In a device of the class described, a support, a member rotable on the support and having differently constructed racks, an index, means for mounting the index for movement along the support, means for moving the index along the support, an escapement mechanism movable with the index and cooperating with any of the racks to constrain the index to a step-by-step movement, means for rotating said member to bring a selected rack into operative relation to the escapement mechanism, and means under the control of an operator for actuating the escapement mechanism.

2. In a device of the class described, a support having a rack, an index, means for mounting the index for movement along the support, means for moving the index along the support, the last specified means comprising a rotary member, a governor-controlled brake regulating the rotation of the rotary member, an escapement mechanism movable with the index and cooperating with the rack to constrain the index to a step-by-step movement, and means under the control of an operator for actuating the escapement mechanism.

3. In a device of the class described, a support having a rack with a plain longitudinal surface, an index, means for mounting the index for movement along the support, mechanism for moving the index along the support, an escapement movable with the index and cooperating with the rack to constrain the index to a step-by-step movement, means under the control of an operator for actuating the escapement, means for mounting the rack movably to bring the said plain longitudinal surface into engagement with the escapement, whereby the index can move freely, independently of the rack and the escapement, and a governor connected to said mechanism and controlling the index when it moves freely as aforesaid.

4. In a device of the class described, a support, a member rotatable on the support and having differently constructed racks, an index, means for mounting the index for movement along the support, an escapement mechanism movable with the index and co-operating with any of the racks to constrain the index to a step-by-step movement, means for rotating said member to bring a selected rack into operative relation to the escapement mechanism, and means under the control of an operator for actuating the escapement mechanism.

5. In a device of the class described, a support having a rack with a plain longitudinal surface, an index, means for mounting the index for movement along the support, an escapement movable with the index and co-operating with the rack to constrain the index to a step-by-step movement, means under the control of an operator for actuating the escapement, means for mounting the rack movably to bring said plain longitudinal surface into engagement with the escapement, whereby the index can move freely, independently of the rack and the escapement, and mechanism for controlling the index when it moves freely as aforesaid.

In testimony that I claim the foregoing as my own, I have hereto affixed my signature.

CHARLES D. HEVENOR.